Jan. 13, 1970    F. K. MILLER    3,488,830
PRECISION ASSEMBLY MANUFACTURING METHOD AND APPARATUS
Filed Aug. 9, 1967    2 Sheets-Sheet 1
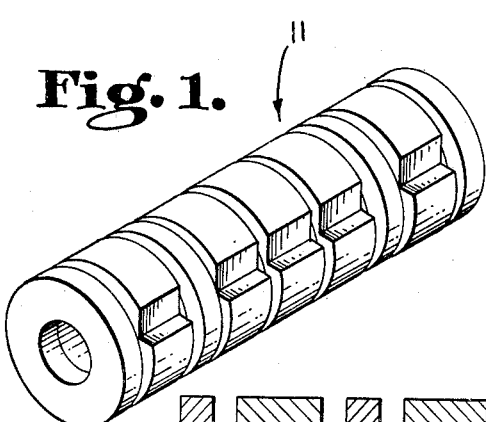
Fig. 1.
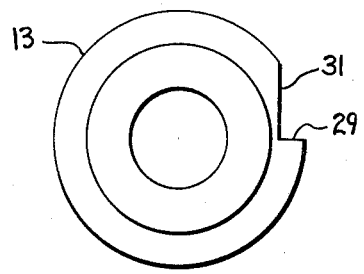
Fig. 2.
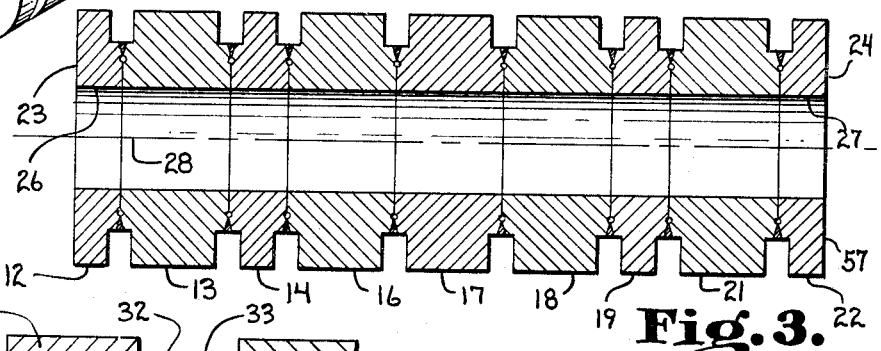
Fig. 3.
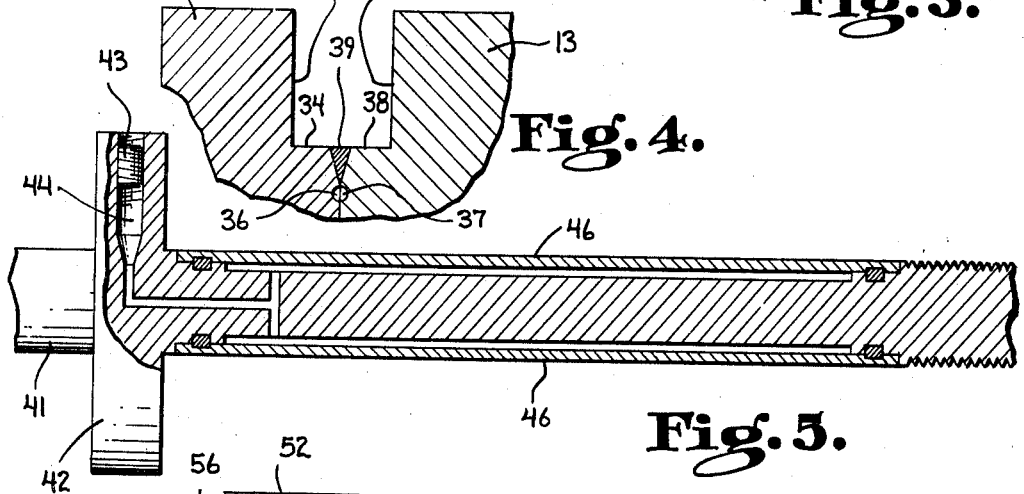
Fig. 4.
Fig. 5.
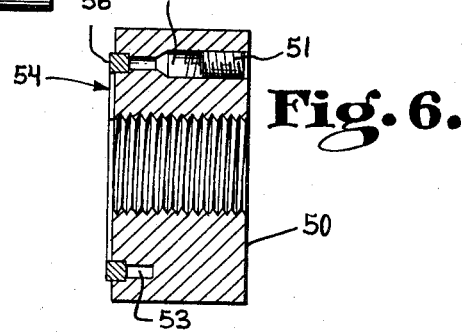
Fig. 6.
INVENTOR.
FRED K. MILLER
BY
Woodard, Weikart, Emhardt & Naughton
Attorneys Jan. 13, 1970   F. K. MILLER   3,488,830
PRECISION ASSEMBLY MANUFACTURING METHOD AND APPARATUS
Filed Aug. 9, 1967   2 Sheets-Sheet 2

INVENTOR.
FRED K. MILLER

United States Patent Office 3,488,830
Patented Jan. 13, 1970

3,488,830
PRECISION ASSEMBLY MANUFACTURING
METHOD AND APPARATUS
Fred K. Miller, Indianapolis, Ind., assignor to The Buehler Corporation, Indianapolis, Ind.
Filed Aug. 9, 1967, Ser. No. 659,504
Int. Cl. B23k 5/22, 27/00
U.S. Cl. 29—493                    5 Claims

ABSTRACT OF THE DISCLOSURE

A welded precision assembly of parts produced by stacking them on a hydraulically expandable arbor, expanding the arbor to a snug but movable condition thereon, establishing the desired angular relationship between the parts on the arbor, clamping them in position by application of a hydraulically operable lock nut, rotating the assembly thus made in a vacuum atmosphere in an electron beam welder and fusing the parts together therein while so clamped on the arbor, and removal therefrom after welding, maintaining required tolerances within one-thousandth of an inch on the welded assembly.

BACKGROUND OF THE INVENTION

Field of invention

This invention relates generally to fused assemblies of metal parts, and more particularly to one wherein extremely close tolerances are maintained in spite of the fact that welding typically, introduces problems of shrinkage, warpage, and varieties of dimensional variations in general.

Description of the prior art

Known prior art apparatus and methods employ various types of arbors and clamping means. Instances have been encountered where rather close control of concentricity of parts is desired, and hydraulically expandable arbors have been used for establishing concentricity. However it is believed that heretofore no combination of parts and tools has been devised which enabled attainment of alignment of flat surfaces on circumference of parts within seven ten-thousandths of an inch, while at the same time maintaining squareness of end faces with respect to bores within three ten-thousandths of an inch and overall straightness within one-thousandth of an inch in a five inch long assembly, in spite of the adverse conditions of heat, melting, and fusion of parts during assembly thereof.

SUMMARY

Described briefly, the invention can be characterized in one embodiment thereof by the mounting of a stack of parts against a shoulder stop on a hydraulically expandable arbor, followed by the installation of a hydraulic lock nut screwed thereon to place the parts in contact with each other and against the stop. The arbor is then expanded against the parts sufficiently to make them finger-tight so that, although they cannot freely move in rotation on the arbor, they can be turned by the fingers with respect to each other a sufficient amount to provide the proper angular index relationship between the respective parts. Then, when the proper relationships have been established, the parts are axially clamped together by application of the hydraulically operable portion of the nut thereto. Then the arbor is expanded further. Then the assembly of the parts and arbor and nut are placed in an electron beam welder, and welded together as they are rotated. Then they are removed from the welder and the parts are removed from the arbor as a complete welded assembly meeting the precision requirements of straightness, squareness, and angular orientation, as well as concentricity.

BRIEF DESCRIPTION OF THE DRAWINGS

FIGURE 1 is a perspective view of a precision assembly made according to the present invention.

FIGURE 2 is an enlarged end view thereof.

FIGURE 3 is a longitudinal section thereto taken on a plane containing the longitudinal axis thereof.

FIGURE 4 is an enlarged fragmentary longitudinal section.

FIGURE 5 is a view which is primarily a longitudinal sectional view through a hydraulic arbor of the type used in the practice of the invention, the ends being broken away to conserve space in the drawing.

FIGURE 6 is a section through a typical hydraulic nut useful in the practice of the invention.

DESCRIPTION OF THE PREFERRED EMBODIMENT

Figure 7:
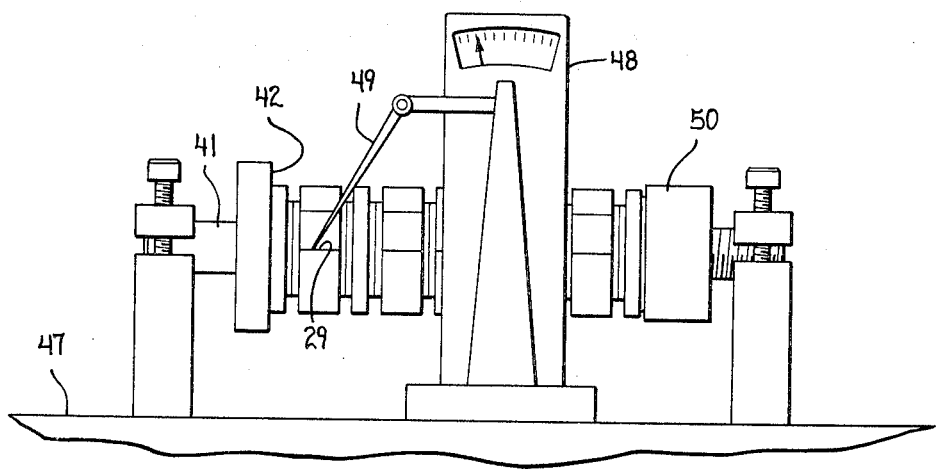
FIGURE 7 is an elevational view of the parts mounted on the hydraulic arbor with a hydraulic nut thereon, the assembly being located in checking fixtures for establishing the proper location of the parts during one step in the procedure.
Figure 8:
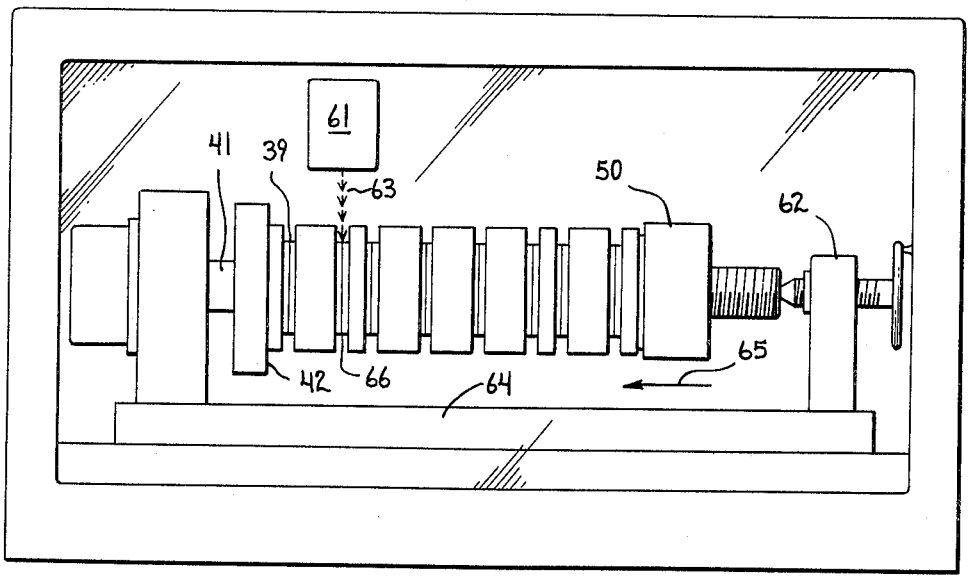
FIGURE 8 is a mechanical schematic diagram of the electron beam welder with the assembly shown in elevation therein, the beam welder being much reduced in size by comparison with the parts to facilitate illustration and conserve space in the drawing.

Referring now to the drawings in detail, assembly 11 is to be made of a series of individual parts 12, 13, 14, 16, 17, 18, 19, 21 and 22, all welded together. All parts have cylindrical outer and inner surfaces and flat end faces, parts 12 and 22 being identical and having flat outer end faces 23 and 24 respectively from their bores 26 and 27 to their outer cylindrical surfaces. The bores of all parts are to be concentric and colinear with the axis 28, and the end faces of the members are to be perpendicular with respect to their bores within .0002 inch. Each of the members 13, 16, 17, 18 and 21 has a pair of flats, such as 29 and 31, in the outer cylindrical surface thereof, and these are at 90° with respect to each other. After welding, all of the flats 29 are to be in-line within .0006 inch.

Where the parts are in abutting relationship with each other, a step is provided in the end faces as at part 12, where the step 32 is provided facing the step 33 in part 13. Also, immediately inward radially from the cylindrical surface 34 at the step 32 is the annular groove 36 facing a like annular groove 37 immediately radially inward from the cylindrical surface 38 on part 13 at the step 33. These grooves facilitate the weld which occurs around the circumference at the joint as indicated at 39.

To accomplish this objective, the hydraulically expandable arbor 41 is provided with a shoulder 42 against which member 12 is located with the face 23 thereof flat against the shoulder 42. The remaining parts are stacked in order on the arbor and the hydraulic nut 50 is screwed on the threaded end of the arbor until the nut holds all the parts in the stack in contact with each other. Then the expander screw 43 on the arbor is turned in sufficiently to cause the hydraulic fluid 44 in the arbor to radially expand the axially extending sleeve 46 thereof against the bore of each of the parts. The screw 43 is turned inwardly sufficiently to be sure that each of the bores is snug on the arbor although each part is movable by a person's fingers if desired for adjustment to the proper angular relationship so as to align the flats 29 and 31 of all the parts. This can be done by inspection techniques, locating the assembly with respect to the surface plate 47 and indicating the surfaces and adjusting them until they are all in suitable alignment, by the use of a suitable dial indicator or electrical indicating instrument 48 and sensor 49. Such equipment is well known and readily available, and is shown schematically for purposes of description only.

Once all of the parts have been properly oriented so that they have the proper angular relationship to each other, which might be evidenced by having all of the flats 29 aligned within .0002 inch for example, the screw 51 on the hydraulic nut is turned inwardly to move the hydraulic fluid in the passage 52 and annular passage 53 and thus apply the force "pad" which, in this instance, is in the form of a circular ring 54 concentric with respect to the axis of the nut, and, therefore, also concentric with the axis of the arbor and the axis 28 of the assembly of parts. The screw is turned in until it feels as though it has hit a solid autment, whereupon the entire circular face 56 of the ring has engaged the face 57 of the member 22 and clamped the assembly against the stop which, in this instance, is the shoulder 42 of the arbor.

Because of the uniform application of hydraulic pressure throughout the entire circumference of the ring and on the face opposite the face 56 engaging the part face 57, there is uniform distrubution of force against the part 57 throughout a circle at a constant radius equal to the radius of the ring 54 on the nut. This force might amount to as much as 8,000 lbs. total, for example. In addition to further straightening the arbor, this assures that all of the faces of the parts are in tight, flat abutting relationship with each other so that no rotation of one part with respect to another can thereafter occur.

Then the expander screw 43 is turned in further on the arbor until it feels like it has reached a stop, whereupon the maximum possible expansion of the arbor against the bores has occured. If all of the bores are virtually perfect, that is within one ten-thousandths of an inch of a nominal diameter under an inch, the total radial expansion on the diameter of the arbor may be as little as three ten-thousandths of an inch. However, an arbor is usually designed with a capability up to approximately one-thousandth inch total expansion on the diameter.

Then the assembly of the arbor, nut, and parts, is again checked with the indicator to be certain that no shifting has occurred. If none has occurred, the assembly can be placed in the electron beam welder shown schematically at 60. The assembly is mounted so that it can be rotated with a suitable motor and gear assembly 62 so that the beam, designated schematically at 63 and projected from the "gun" 61 can weld one joint at a time around its circumference. After one joint is welded, the assembly is linearly advanced in the direction of arrow 65, for example, to weld the next joint, all of this being done in a suitably low vacuum for such purposes.

As indicated above, as the weld at one joint 39 is completed, for example, after indexing the assembly 360° by means of the index drive 62. Then the assembly is shifted linearly by means of the carriage 64 to which it is mounted in the welder, whereupon the beam 63 is applied to the next joint 66. When the joints have all been welded, the assembly is removed from the welder. The hydraulic pressure is released in the arbor and the nut by turning the respective screws outwardly so as to allow the arbor to contract and the ring to move back into the nut. Then the parts, welded together, can be removed from the arbor and meet the required tolerances.

An important feature of this invention is not only the fact that the parts are held properly in position from the standpoints of concentricity, colinearity, squareness, and angular index, but also that they are maintained in the proper position without movement during the welding operation, in spite of the energy input to the parts which takes place in the welding operation. The utilization of the hydraulically expandable arbor and hydraulic clamping lock nut facilitate this achievement, and, in this connection, it is important that the arbor and nut be able to accommodate whatever shrinkage or expansion might occur during the welding operation.

Bearing in mind that both the arbor and the nut utilize hydraulic pressure to maintain the tight condition, the arbor and nut are provided with sufficient volume of hydraulic fluid therein to render negligible any tendency of the hydraulic pressure to decrease as a result of expansion of the bores (in the case of the arbor) or due to shrinkage endwise (in the case of the nut).

While the invention has been disclosed and described in some detail in the drawings and foregoing description, they are to be considered as illustrative and not restricted in character, as other modifications may readily suggest themselves to persons skilled in this art and within the broad scope of the invention, reference being made to the appended claims.

The invention claimed is:

1. A method of precision manufacture comprising the steps of:
    placing parts on an arbor;
    locating said parts axially by abutting one of said parts against a stop on said arbor and supporting others of said parts in a stack against said one part;
    expanding said arbor radially against said parts to make said parts snug but movable thereon;
    turning one of said parts with respect to another of said parts to obtain the desired precise rotational index relationship therebetween;
    applying an axial clamping force directed toward said stop and distributed around a face of the one of said parts most remote from said stop, such that said parts are immovable with respect to each other; and
    fusing each of said parts to each other of said parts which it abuts, while keeping said clamping force applied.

2. The method of claim 1 and further comprising the step of:
    expanding said arbor tightly against said parts after initial application of said clamping force and keeping said arbor expanded tightly against said parts during the fusing thereof.

3. The method of claim 1 and further comprising the steps of:
    engaging a pressure pad with the face of the one of said parts most remote from said stop, and
    establishing hydraulic pressure against said pad opposite said face and at uniform radius from the axis of said arbor to thereby generate and apply said axial clamping force.

4. The method of claim 1 and further comprising the step of:
    retaining said parts in a stack against said stop and before expanding said arbor by screwing a hydraulic lock nut onto said arbor and into position holding said parts together in a stack against said stop.

5. The method of claim 4 and further comprising the steps of:
    expanding said arbor sufficiently to establish concentricity of said parts with the axis of said arbor before applying said axial clamping force;
    engaging a pressure pad of said hydraulic lock nut with the face of the one of said parts most remote from said stop,
    establishing hydraulic pressure against said pad opposite said face and at uniform radius from the axis of said arbor to thereby generate and apply said axial clamping force,
    applying electron beam welding heat to said parts effecting the fusion thereof in a vacuum,
    rotating said arbor on its axis during the fusion of said parts to apply said heat progressively to different portions of said parts, removal of the vacuum subsequent to fusion of said parts together;
removal of said axial clamping force and said nut, contraction of said arbor, and
removal of the assembly of fused parts from said arbor.

References Cited
UNITED STATES PATENTS

| | | | | |
|---|---|---|---|---|
| 1,642,825 | 9/1927 | Pearce | 219—160 X |
| 1,696,455 | 12/1928 | Rupley | 219—160 |
| 2,734,120 | 2/1956 | Sensenig | 269—48.1 X |
| 3,256,590 | 6/1966 | Myers | 29—596 X |

JOHN F. CAMPBELL, Primary Examiner

R. J. SHORE, Assistant Examiner

U.S. Cl. X.R.

29—464; 219—160; 269—48.1